(12) United States Patent
Dickens

(10) Patent No.: US 6,958,755 B1
(45) Date of Patent: Oct. 25, 2005

(54) PERSONALIZED COMPUTER FONTS

(75) Inventor: James Edward Dickens, Ocoee, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 659 days.

(21) Appl. No.: 10/068,261

(22) Filed: Feb. 6, 2002

(51) Int. Cl.[7] .......................... G09G 11/00; G09G 5/26; G06K 9/18; G06K 9/00
(52) U.S. Cl. ...................... 345/467; 345/468; 345/471; 382/186; 382/187
(58) Field of Search ...... 345/467–472.3; 382/167–168

(56) References Cited

U.S. PATENT DOCUMENTS

| | | | | |
|---|---|---|---|---|
| 5,412,771 A | * | 5/1995 | Fenwick | 345/468 |
| 6,298,154 B1 | * | 10/2001 | Cok | 382/186 |
| 6,707,466 B1 | * | 3/2004 | Van Sickle et al. | 345/641 |
| 2001/0048436 A1 | * | 12/2001 | Sanger | 345/467 |
| 2004/0091176 A1 | * | 5/2004 | Bai | 382/305 |

OTHER PUBLICATIONS vLetter software documentation. Sample forms from website. ≃≃http://www.vletter.com/images/davescan.jpg ≃≃http://www.vletter.com/products_vl_pro.htm.*

* cited by examiner

*Primary Examiner*—Jeffery Brier
*Assistant Examiner*—Eric V Woods
(74) *Attorney, Agent, or Firm*—Merchant & Gould

(57) ABSTRACT

A system and method for creating a personalized font allow a user to write characters as they should appear when used within a word processing document. A sheet having a grid is printed. The grid includes a blank space and an indication of the character that should be written in the blank space. The user writes in the characters on the sheet and then scans the sheet to digitize the characters. A computer system then analyzes the scan to extract each character as written and associate the extracted character with the appropriate character of a character set. The digitized and associated character data is then saved as a font that may be used by word processing programs.

14 Claims, 3 Drawing Sheets

PERSONALIZED COMPUTER FONTS

TECHNICAL FIELD

The present invention is related to computer fonts used for text within a document. More specifically, the present invention is related to creating personalized computer fonts to be used for text in documents.

BACKGROUND

The particular font used for text in a document greatly affects the appearance and readability of the document. Before electronic word processors, typewriters provided a standard font and allowed for no variation from one document to the next. The look of the text was not controllable, and a user's ability to personalize a document was greatly limited.

Electronic word processors, including dedicated devices as well as software programs for general-purpose computers, provide users with a variety of computer fonts that may be selected. Computer fonts for electronic word processors control how the text appears within a document on the display screen and on subsequent printouts. Although a variety of computer fonts are available, each one is generic and is not customized for any particular user.

Some variety is currently available to the user when deciding how the document should appear, but personalized computer fonts are not available. The universe of commercially available or default computer fonts is limited. Thus, if the existing computer fonts do not provide a particular look for a character, then the user must accept a less desirable character appearance.

Therefore, there is a need for a system that enables users to generate customized computer fonts.

SUMMARY

Embodiments of the present invention provide users the ability to create personalized fonts that can be used in documents generated on electronic word processors. The user is provided a sheet having a grid pattern that allows the user to write characters on blank spaces of the sheet. The characters of the personalized font have the same appearance as the written characters. The sheet provides an indication of each character that should be written in each of the blanks. The sheet is scanned and the written characters are digitized. Each digitized character is associated with the particular character assigned to the corresponding blank space position on the sheet. The digitized and associated characters are stored within a font format for subsequent selection within a word processing program.

The sheet may include spaces for alphabetical characters, numerical characters, and additional characters such as mathematical symbols and signatures. The digitization may involve detecting the color of the particular written character, and the color may be associated with the character when stored as a font so that the character of the personalized font appears in the document in the designated color. To properly orient the digitized character so that it is not upside-down or otherwise incorrect if not scanned in an expected manner, registration marks may be provided on the sheet. From the registration marks, it can be determined whether the characters are scanned normally or in an abnormal way, and the digitized character's orientation can be rotated as necessary before being stored in the font.

The various aspects of the present invention may be more clearly understood and appreciated from a review of the following detailed description of the disclosed embodiments and by reference to the drawings and claims.

DETAILED DESCRIPTION

Figure 1:
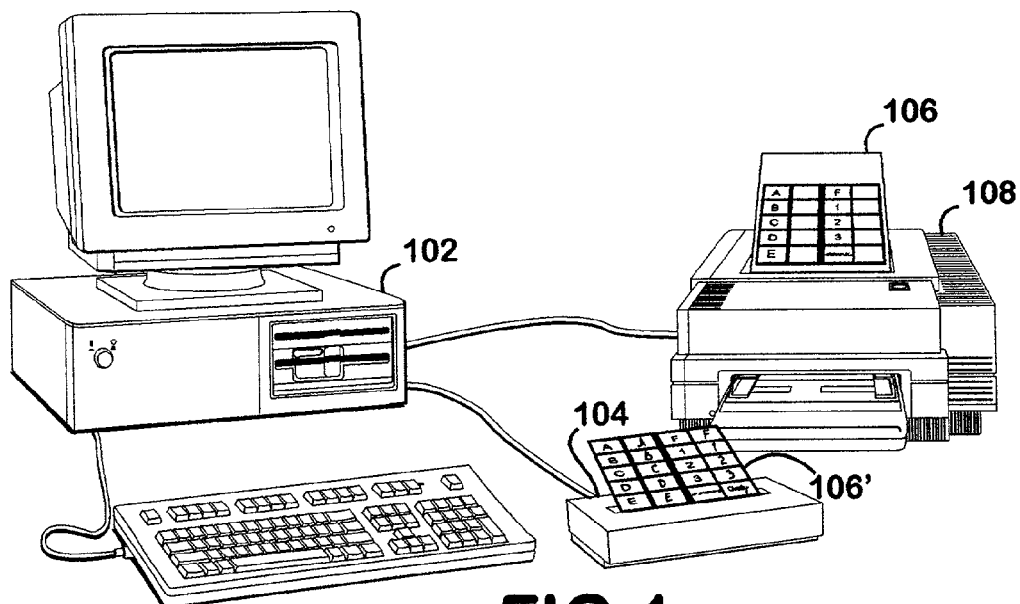
FIG. 1 is a diagram of an exemplary computer system for creating personalized computer fonts.

Embodiments of the present invention may be implemented on a computer system 102 as shown in FIG. 1. The general-purpose computer system 102 includes peripheral devices including a page scanner 104 and a printer 108. The general-purpose computer system 102 may execute software to implement logical operations that create a personalized computer font. The logical operations involve interaction with the peripheral devices. The computer instructions for performing the logical operations discussed herein form a computer program product, such as computer code stored on a magnetic or optical storage medium or computer code in transit while embedded in a propagated wireline or wireless signal. Alternatively, a computer system 102 may employ hardwired digital logic to implement the logical operations discussed herein.

To implement an embodiment, the computer 102 sends data to a printer 108 that causes it to print a sheet 106 that includes a grid. The user writes characters within the grid on the sheet 106. The appearance of the written characters is used as the appearance of characters of the personalized computer font. Once the user has written the characters on the sheet 106, the user may place the personalized sheet 106' on the scanner 104. The scanner 104 scans the personalized sheet 106' to digitize the sheet including each character that is written on it.

The computer 102 receives the scanned data for the sheet 106' and then extracts each digitized character. Based on the position of each digitized character from the scanned sheet 106', the computer 102 associates the extracted character with its corresponding character of a character set. Once all characters for a particular font are extracted and associated by the computer 102, the data is saved as a personalized computer font that may be named by the user.

Figure 2:
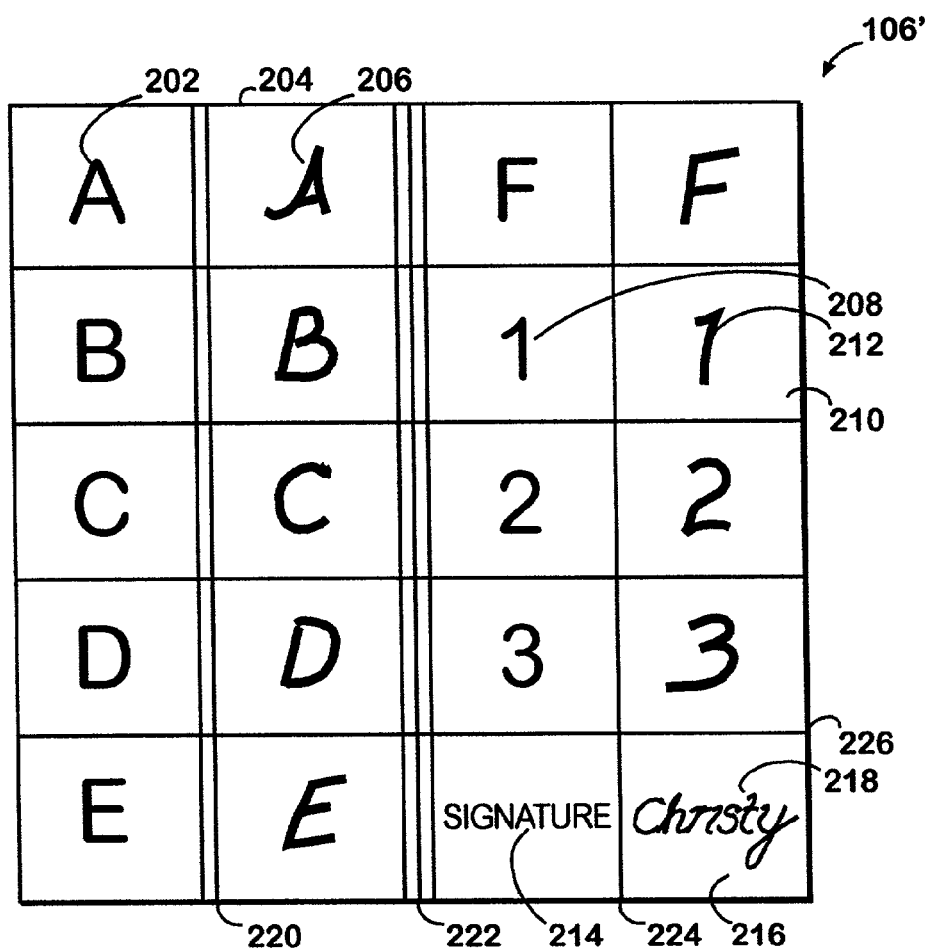
FIG. 2 is an example of a sheet that users may write characters on as they should appear within the personalized computer font.

FIG. 2 shows an example of a sheet 106' where the user has written in the characters for the personalized computer font. The sheet 106' has a grid that provides printed alphabetical characters 202 and printed numerical characters 208 to indicate what should be written in each formerly blank space 204 and 210, respectively. The user writes in the corresponding alphabetical character 206 and/or numerical character 212 as desired. The written character 206, 212 may be written in a specific color if the user prefers the character to appear in documents as the specific color.

Other non-alphabetical or non-numerical characters that are symbolic characters may also be included such as punctuation marks, dollar signs, and any other character that may be selected through a keyboard or word processor character menu. Additionally, non-standard characters may be included on the sheet 106' such as a user's signature. A signature indicator 214 may be provided adjacent a blank signature block 216 where the user may sign his or her name 218. As with other characters, the user signs the name 218 in a specific color if the signature is to appear in a document in the specific color.

To ensure that characters are not oriented incorrectly when scanned, such as being upside down, the user may be instructed to position the sheet 106' in the scanner with the top of the sheet in the proper place to be scanned as the top of the digitization. Alternatively, registration marks may be included in the grid. For example, vertical grid lines may be included to delineate left versus right and thereby signal whether the sheet 106' has been scanned with an abnormal orientation.

In the example shown in FIG. 2, a sheet has been scanned with a normal orientation when double vertical lines 220 are encountered first and triple vertical lines 222 are encountered thereafter when analyzing from left to right across the digitized sheet 106'. The double lines 220 specify the left boundary of a character space of a first column, and the triple lines 222 specify the right boundary. A single vertical line 224 specifies the left boundary of a character space of a second column, where the sheet 106' contains two columns of character space. Single horizontal lines 226 specify the top and bottom boundaries of the character spaces.

If the left to right analysis of the scanned sheet 106' does not encounter a double line boundary 220 and a triple line boundary 222, then the sheet 106' has been scanned perpendicular to the correct direction and the scanned sheet 106' must be rotated 90 degrees clock-wise or counter-clock-wise to properly orient the characters. If a left to right analysis encounters a triple line boundary 222 before a double line boundary 220, then the scanned sheet 106' must be rotated 180 degrees to properly orient the characters.

Figure 3:
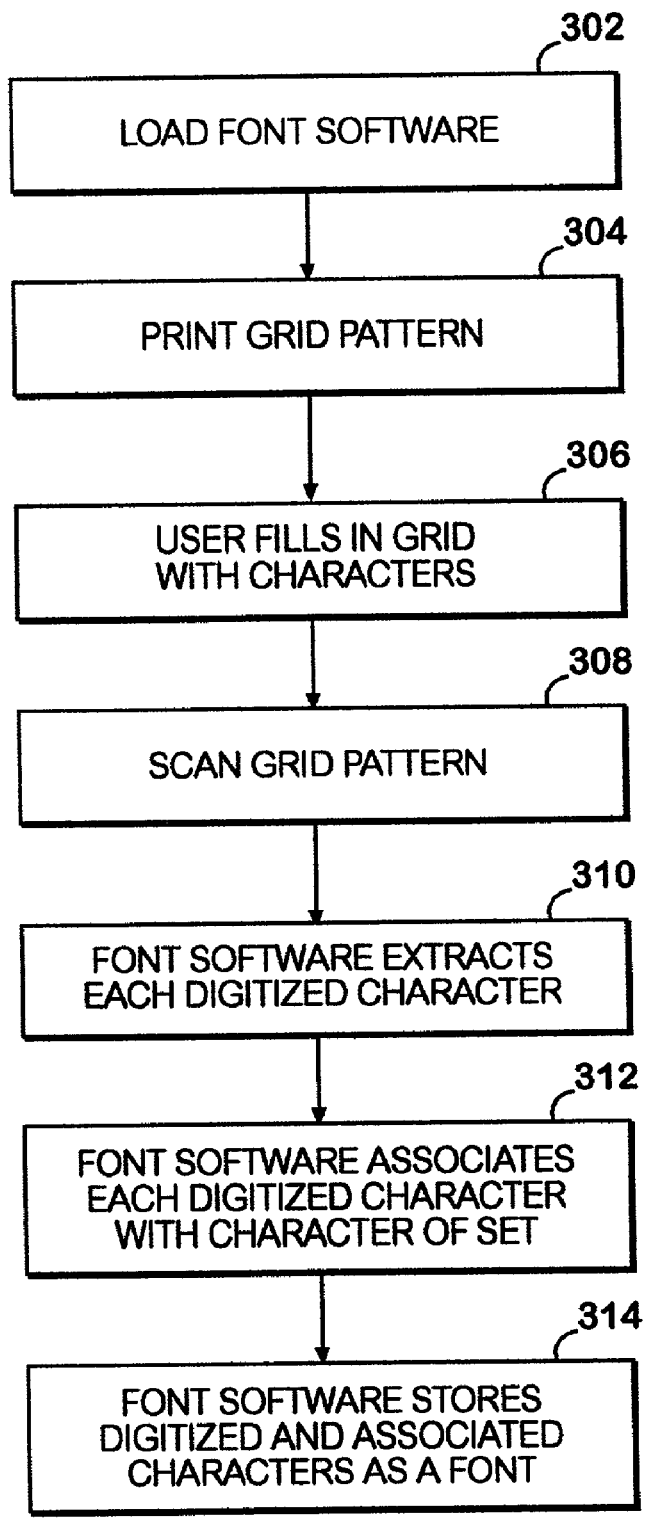
FIG. 3 is an exemplary operational flow for using a general-purpose computer to create the personalized computer font from the writing on the sheet of FIG. 2.

FIG. 3 shows exemplary logical operations of the computer system 102 for creating the personalized font. First the user loads the personalized font software to begin the process at software operation 302. The software then causes the printer 108 to print the grid pattern on sheet 106 at print operation 304. The user then writes the characters as desired on the sheet 106 at write operation 306.

After writing the characters on the sheet 106, the personalized sheet 106' is digitized by the scanner 104 at scan operation 308. Various scan resolutions may be used depending upon the quality desired for the personalized font. At extraction operation 310, the font software extracts each digitized character from the digitized sheet 106'. As discussed in greater detail with reference to FIG. 4, the font software checks for and corrects an abnormal orientation of the digitized sheet 106' prior to extracting the personalized characters. As part of extracting each character, any color in addition to black is recognized and the color data is included with the character data extracted from the digitization.

After each character has been extracted, the font software associates each extracted character, and color data where appropriate, with the character it represents at association operation 312. The association is based on a known pattern of the characters' placement on the sheet 106', assuming a normal or corrected scan orientation, so that the character written where an "A" should be placed is assigned as the "A" for the personalized font. Once the digitized characters have been associated with the correct character of the character set, the font software stores the font data as a personalized font, which may subsequently be used by word processing software, at save operation 314.

Figure 4:
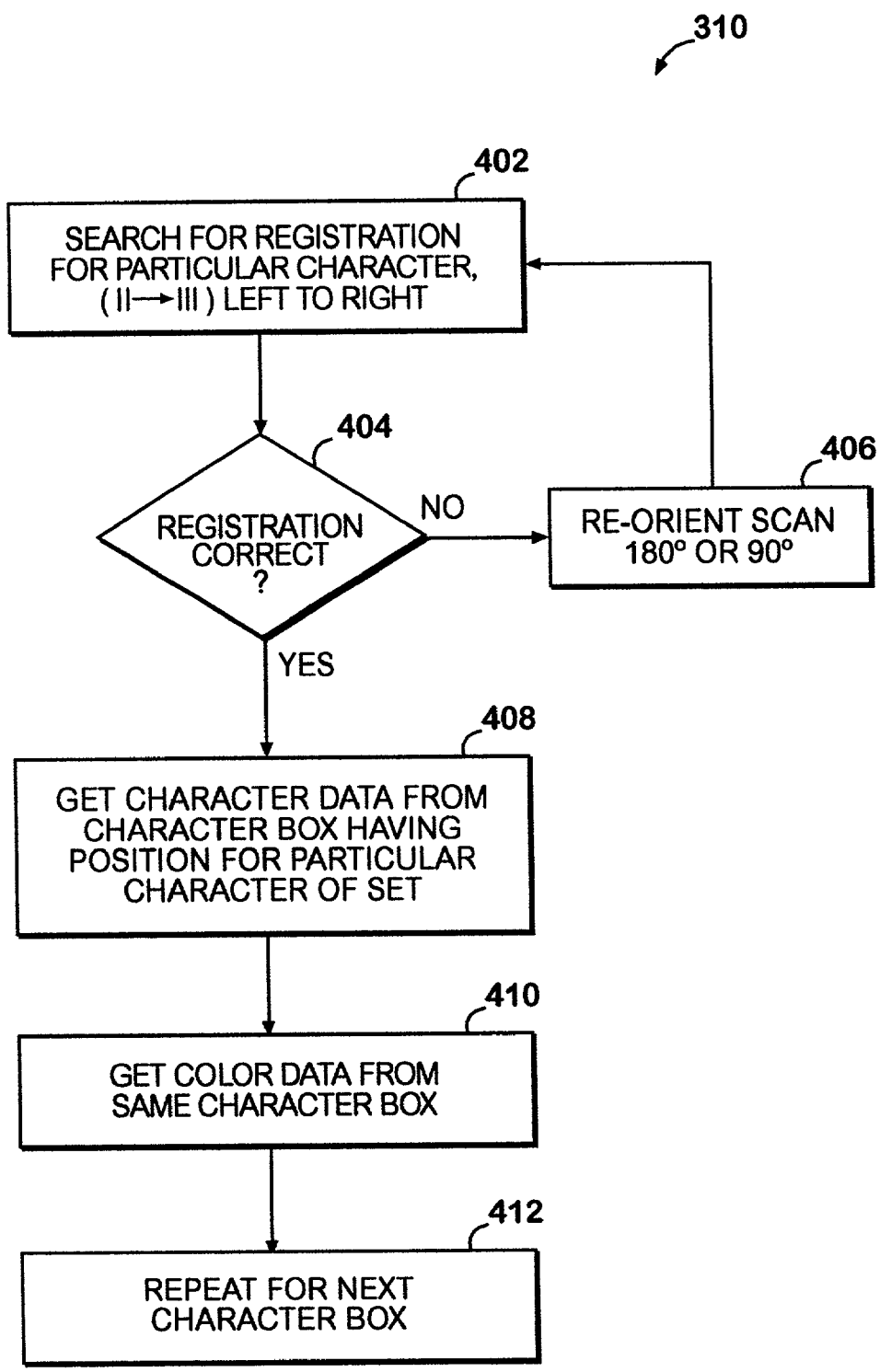
FIG. 4 is an exemplary operational flow for the character extraction operation of FIG. 3.

FIG. 4 shows the logical operations of the extraction operation 310. The process begins by searching for the correct pattern of registration marks, such as double lines to triple lines in a left to right analysis, at registration operation 402. Query operation 404 detects whether the registration is correct. If not, then the scan is re-oriented by rotating 180 degrees or 90 degrees depending upon whether the search for registration marks indicates an upside down or perpendicular orientation. Operational flow then returns to registration operation 402.

If query operation 404 detects that the proper orientation has been found, then character operation 408 gets the character data for the character box with a particular known position within the scanned sheet 106'. The character data representing character shape can be obtained through differentiation in pixel intensity from background space as is well known in the art. Additionally, color data may be obtained at color operation 410 with reference to the color value for each pixel of character data. Once the character data and color data for a particular character has been extracted, the operations are repeated for the next character at repeat operation 412 until all characters of the sheet 106' have been extracted.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer system for creating a font, comprising:
   a sheet having a grid pattern, the grid pattern providing blank spaces with an indication of a character associated with each blank space, the blank spaces containing hand-written characters, the sheet having a first set of registration marks and a second set of registration marks, the first set of registration marks differing in number from the second set of registration marks, wherein the first set of registration marks are spaced apart from and similarly oriented as the second set of registration marks;
   a scanner that digitizes the hand-written characters, wherein the first and second sets of registration marks aid in automatically, digitally orienting the sheet in the scanner;
   a processor in communication with the scanner, the processor being configured to receive the digitized characters from the scanner, associate the digitized characters with the characters of a character set based upon the position of the written characters on the sheet, and store the associated and digitized characters as a font.

2. The computer system of claim 1, wherein one or more of the written characters are alphabetical characters and one or more of the written characters are symbolic characters.

3. The computer system of claim 1, wherein one or more of the written characters are numerical.

4. The computer system of claim 1, wherein one of the blank spaces is associated with a signature.

5. The computer system of claim 1, wherein the sheet includes characters written in a color other than black, and wherein the processor is further configured to associate the digitized character with the color of the written character and store the association of color for each character for the font.

6. The computer system of claim 1, further comprising a printer in communication with the processor, wherein the processor is further configured to cause the printer to print the sheet with each character printed adjacent each blank space associated with the character and wherein each printed character indicates the character to be written in each blank space.

7. The computer system of claim 1, wherein the grid pattern provides a registration of the sheet and wherein the processor is further configured to associate the digitized characters with the corresponding characters by determining the orientation of the character from the registration of the sheet.

8. A computer-readable medium having computer executable instructions which when executed by a computing device provides a method for creating a font, wherein the method comprises:

scanning a sheet having a first set of registration marks and a second set of registration marks, the first set of registration marks differing in number from the second set of registration marks, wherein the first set of registration marks are spaced apart from and similarly oriented as the second set of registration marks to digitize written characters on the sheet, the sheet having a grid pattern that provides blank spaces with an indication of the character associated with each blank space and wherein the written characters are positioned within the blank spaces, the first and second sets of registration marks assisting to automatically, digitally orient the sheet when scanning;

associating the digitized characters with the corresponding characters of a character set according to the position of the written characters on the sheet; and storing the associated and digitized characters as a font.

9. The computer-readable medium of claim 8, wherein the written characters include alphabetical characters.

10. The computer-readable medium of claim 8, wherein the written characters include numerical characters.

11. The computer-readable medium of claim 8, wherein one of the blank spaces is associated with a signature and one or more of the blank spaces is associated with symbolic characters.

12. The computer-readable medium of claim 8, wherein the sheet includes characters written in a color other than black, and wherein the step of associating the digitized characters includes associating the digitized character with the color of the written character and storing the association of color for each character for the font.

13. The computer-readable medium of claim 8, wherein the grid pattern provides a registration of the sheet and wherein the step of associating the digitized characters with the corresponding characters includes determining the orientation of the character from the registration of the sheet.

14. A computer system operable to create a font, the computer system comprising:

a sheet having a pattern, the pattern including blank spaces with an indication of a character associated with each blank space, wherein one or more of the blank spaces contain hand-written characters, the sheet further including a first set of registration marks and a second set of registration marks, the first set of registration marks spaced apart from and differing from the second set of registration marks;

a scanner operable to extract and digitize the hand-written characters, wherein the first and second sets of registration marks aid in automatically, digitally orienting the sheet in the scanner and the first set of registration marks are encountered first in a left to right scan;

a processor in communication with the scanner, the processor being configured to receive the digitized characters from the scanner, associate the digitized characters with the characters of a character set based upon the position of the written characters on the sheet, and store the associated and digitized characters as a font.

\* \* \* \* \*